United States Patent
Krishnamoorthy

(10) Patent No.: US 11,550,629 B2
(45) Date of Patent: Jan. 10, 2023

(54) SYSTEM FOR IMPLEMENTING DATA ANALYTICS IN MAINFRAME ENVIRONMENTS

(71) Applicant: BANK OF AMERICA CORPORATION, Charlotte, NC (US)

(72) Inventor: Madhusudhanan Krishnamoorthy, Chennai (IN)

(73) Assignee: BANK OF AMERICA CORPORATION, Charlotte, NC (US)

(*) Notice: Subject to any disclaimer, the term of this patent is extended or adjusted under 35 U.S.C. 154(b) by 283 days.

(21) Appl. No.: 16/901,356

(22) Filed: Jun. 15, 2020

(65) Prior Publication Data
US 2021/0389987 A1 Dec. 16, 2021

(51) Int. Cl.
*G06F 9/50* (2006.01)
*G06F 8/30* (2018.01)
*G06F 9/48* (2006.01)

(52) U.S. Cl.
CPC ............ *G06F 9/5011* (2013.01); *G06F 8/311* (2013.01); *G06F 9/4881* (2013.01)

(58) Field of Classification Search
CPC ...... G06F 9/5011; G06F 8/311; G06F 9/4881; G06F 2209/549; G06F 8/61; G06F 9/5055; G06F 8/41
See application file for complete search history.

(56) References Cited

U.S. PATENT DOCUMENTS

| | | | |
|---|---|---|---|
| 4,974,191 A * | 11/1990 | Amirghodsi | G06F 40/30 |
| | | | 704/8 |
| 5,630,127 A | 5/1997 | Moore et al. | |
| 6,839,680 B1 | 1/2005 | Liu et al. | |
| 7,080,066 B1 | 7/2006 | Scheurich et al. | |
| 7,093,200 B2 | 8/2006 | Schreiber et al. | |
| 7,613,728 B2 | 11/2009 | Png et al. | |
| 7,634,478 B2 | 12/2009 | Yang et al. | |
| 7,647,298 B2 | 1/2010 | Adya et al. | |
| 7,698,398 B1 * | 4/2010 | Lai | G06Q 30/00 |
| | | | 709/228 |
| 7,747,559 B2 * | 6/2010 | Leitner | G06Q 30/02 |
| | | | 715/733 |
| 7,805,417 B2 | 9/2010 | Noble et al. | |

(Continued)

*Primary Examiner* — Matthew J Brophy
(74) *Attorney, Agent, or Firm* — Moore & Van Allen PLLC; Anup Shrinivasan Iyer

(57) ABSTRACT

Systems, computer program products, and methods are described herein for implementing data analytics in a mainframe environment. The present invention is configured to determine one or more data analytics resources associated with natural language processing algorithms; initiate one or more compiler protocols on the one or more data analytics resources to build one or more executable code for the one or more data analytics resources capable of being executed on a mainframe environment; establish a communication link with a job control language (JCL) subsystem associated with the mainframe environment; transmit the one or more executable code for the one or more data analytics resources to the JCL subsystem; generate one or more job control statements configured to be executable on the mainframe environment; generate a log of the one or more job control statements; and initiate an execution of the one or more job control statements on the mainframe environment.

20 Claims, 3 Drawing Sheets

(56) References Cited

U.S. PATENT DOCUMENTS

| | | | |
|---|---|---|---|
| 8,051,091 B2 | 11/2011 | Werner et al. | |
| 8,055,650 B2 | 11/2011 | Scanlon et al. | |
| 8,069,435 B1* | 11/2011 | Lai | H04L 67/51 |
| | | | 717/106 |
| 8,131,659 B2 | 3/2012 | Xu et al. | |
| 8,140,362 B2 | 3/2012 | Deshpande et al. | |
| 8,264,505 B2 | 9/2012 | Bathiche et al. | |
| 8,301,638 B2 | 10/2012 | Xu et al. | |
| 8,606,803 B2 | 12/2013 | Bhatawdekar et al. | |
| 8,626,573 B2 | 1/2014 | Niheu et al. | |
| 8,676,577 B2 | 3/2014 | Jablokov et al. | |
| 8,978,034 B1 | 3/2015 | Goodson et al. | |
| 9,043,267 B2 | 5/2015 | Kozlov et al. | |
| 9,064,224 B2 | 6/2015 | Xiong et al. | |
| 9,449,034 B2 | 9/2016 | B'Far et al. | |
| 10,042,955 B2 | 8/2018 | VanderDrift | |
| 10,956,513 B2* | 3/2021 | Ahmed | G06N 20/00 |
| 11,061,605 B1* | 7/2021 | Biondo, Jr. | G06F 3/0604 |
| 2005/0086579 A1* | 4/2005 | Leitner | G06Q 30/02 |
| | | | 715/229 |
| 2007/0022027 A1* | 1/2007 | Gupta | G06N 20/00 |
| | | | 707/999.1 |
| 2017/0344639 A1* | 11/2017 | Ahmed | G06F 16/972 |
| 2017/0344887 A1* | 11/2017 | Ahmed | G06N 20/00 |
| 2018/0189680 A1* | 7/2018 | Gupta | G06F 8/38 |
| 2018/0285165 A1* | 10/2018 | Helsley | G06F 9/5077 |
| 2018/0300186 A1* | 10/2018 | Grantham | G06F 16/258 |
| 2020/0356628 A1* | 11/2020 | An | G06F 40/211 |
| 2021/0216237 A1* | 7/2021 | Biondo, Jr. | G06F 3/0655 |
| 2021/0358601 A1* | 11/2021 | Pillai | G16H 40/20 |
| 2021/0365256 A1* | 11/2021 | Cadarette | H04L 63/102 |

\* cited by examiner

… in response to receiving the indication from the computing device of the user to access the mainframe environment to validate an identity and authorization level of the user.

In some embodiments, the at least one processing device is further configured to: initiate, via the security governance engine, an authentication request to the user in response to receiving the indication to access the mainframe environment; electronically receive, from the computing device of the user, one or more authentication credentials associated with the user; validate the one or more authentication credentials, wherein validating further comprises verifying the identity of the user and determining whether the authorization level of the user meets an authentication requirement associated with the mainframe environment to authorize access; and authorize the user to access the mainframe environment using the computing device of the user.

In another aspect, a computer program product for implementing data analytics in a mainframe environment is presented. The computer program product comprising a non-transitory computer-readable medium comprising code causing a first apparatus to: determine one or more data analytics resources associated with natural language processing algorithms; initiate one or more compiler protocols on the one or more data analytics resources to build one or more executable code for the one or more data analytics resources capable of being executed on a mainframe environment; establish a communication link with a job control language (JCL) subsystem associated with the mainframe environment; transmit the one or more executable code for the one or more data analytics resources to the JCL subsystem; generate, using the JCL subsystem, one or more job control statements based on at least the one or more executable code for the one or more data analytics resources, wherein the one or more job control statements are configured to be executable on the mainframe environment; generate a log of the one or more job control statements, wherein generating the log further comprises placing the one or more job control statements in a queue; and initiate an execution of the one or more job control statements on the mainframe environment based on at least the generated log.

In yet another aspect, a method for implementing data analytics in a mainframe environment is presented. The method comprising: determining one or more data analytics resources associated with natural language processing algorithms; initiating one or more compiler protocols on the one or more data analytics resources to build one or more executable code for the one or more data analytics resources capable of being executed on a mainframe environment; establishing a communication link with a job control language (JCL) subsystem associated with the mainframe environment; transmitting the one or more executable code for the one or more data analytics resources to the JCL subsystem; generating, using the JCL subsystem, one or more job control statements based on at least the one or more executable code for the one or more data analytics resources, wherein the one or more job control statements are configured to be executable on the mainframe environment; generating a log of the one or more job control statements, wherein generating the log further comprises placing the one or more job control statements in a queue; and initiating an execution of the one or more job control statements on the mainframe environment based on at least the generated log.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
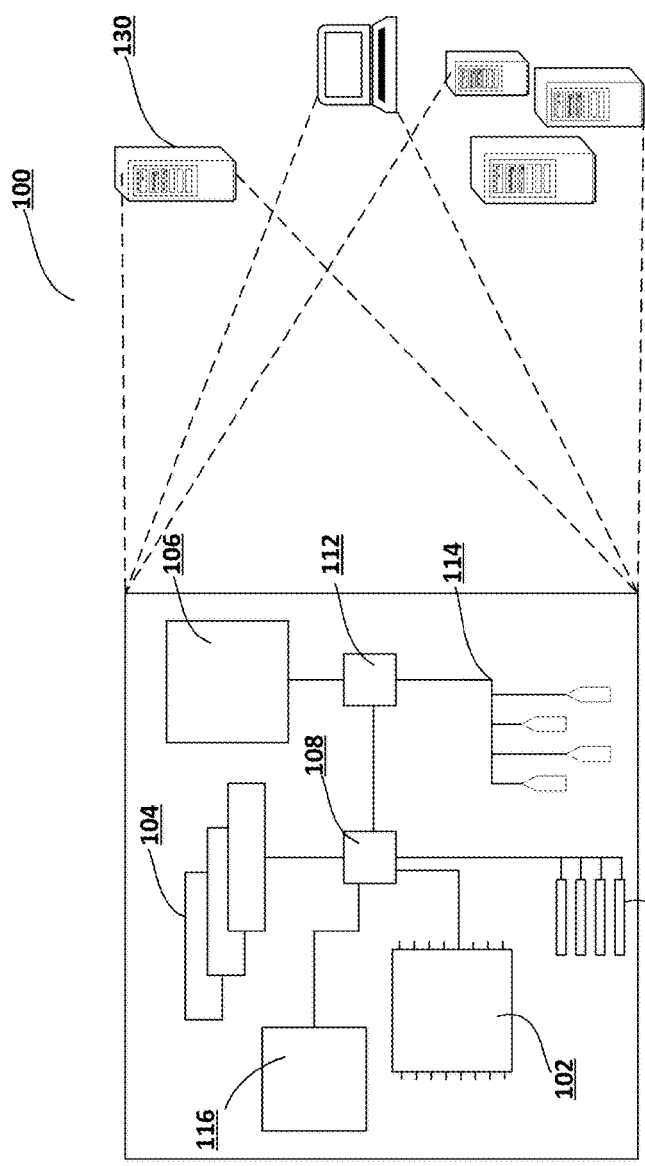
Figure 1:
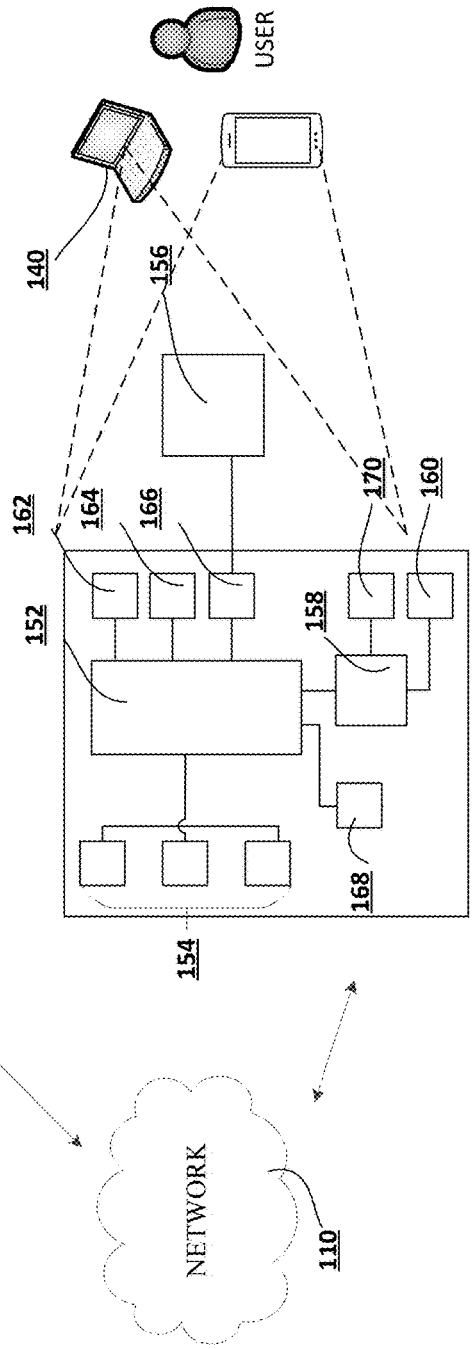
Figure 2:
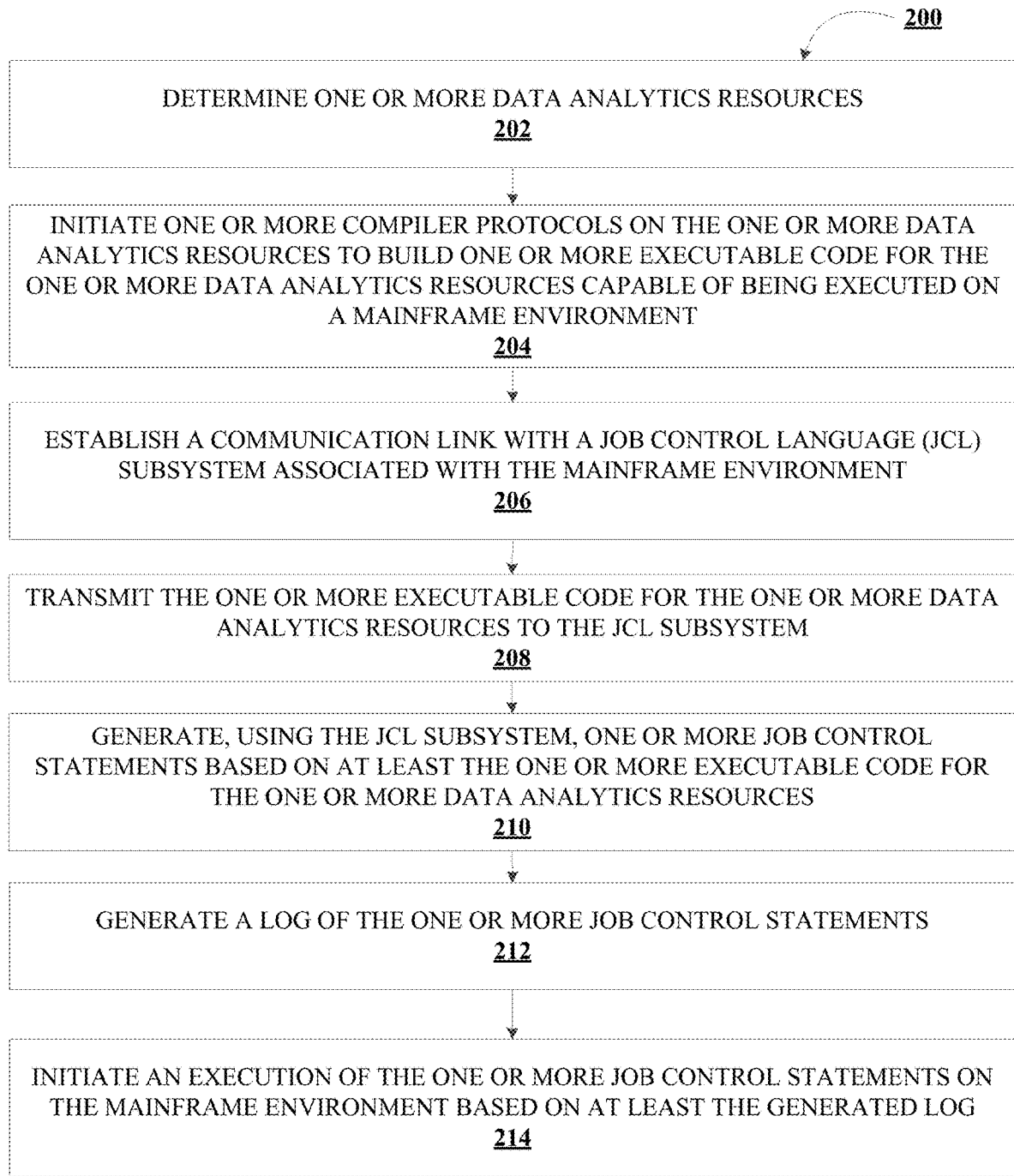
Figure 3:
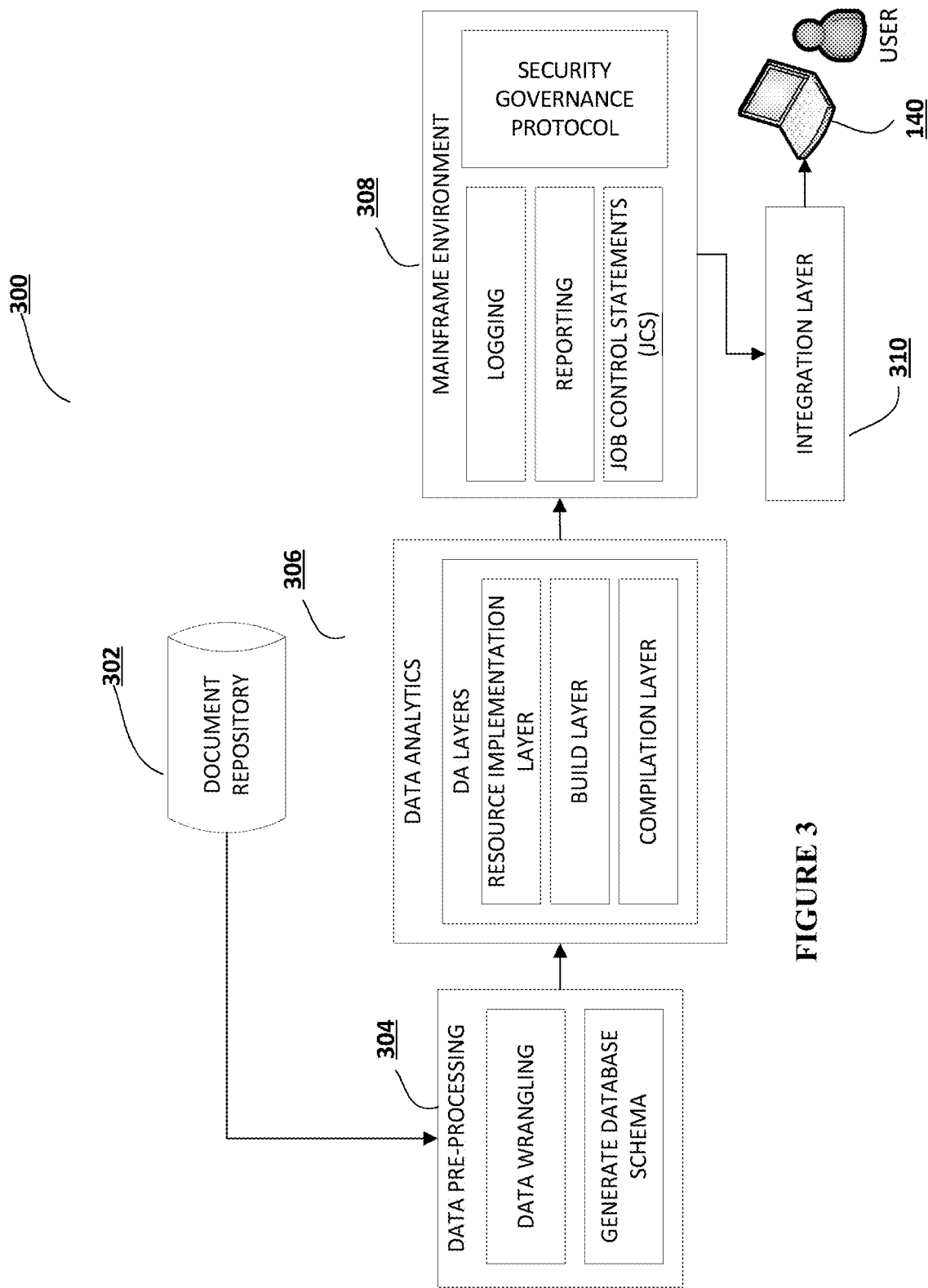

Having thus described embodiments of the invention in general terms, reference will now be made the accompanying drawings, wherein:

FIG. 1 illustrates technical components of a system for implementing data analytics in a mainframe environment, in accordance with an embodiment of the invention;

FIG. 2 illustrates a process flow for implementing data analytics in a mainframe environment, in accordance with an embodiment of the invention; and FIG. 3 illustrates a flow chart for implementing data analytics in a mainframe environment, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of a computer program, or part of a computer program that serves as a foundation for a larger piece of software and drives the functionality of the software. An engine may be self-contained, but externally-controllable code that encapsulates powerful logic designed to perform or execute a specific type of function. In one aspect, an engine may be underlying source code that establishes file hierarchy, input and output methods, and how a specific part of a computer program interacts or communicates with other software and/or hardware. The specific components of an engine may vary based on the needs of the specific computer program as part of the larger piece of software. In some embodiments, an engine may be configured to retrieve resources created in other computer programs, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, a "resource" or "data analytics resource" may generally refer to a collection of pre-written code, objects, procedures, scripts, products, devices, goods, commodities, services, and the like, and/or the ability and opportunity to access and use the same for software development. Some example implementations herein contemplate configuration data, documentation, help data, message templates, pre-written code and subroutines, classes, values or type specifications, and implementations of behavior. In some embodiments, a resource may be organized in such a way that it can be used by multiple programs that have no connection to each other at different program lifecycle phases.

As used herein, "authentication credentials" may be any information that can be used to identify of a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

As used herein, an "interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like.

FIG. 1 presents an exemplary block diagram of the system environment for implementing data analytics in a mainframe environment 100, in accordance with an embodiment of the invention. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, and a user input system 140. Also shown in FIG. 1 is a user of the user input system 140. The user input system 140 may be a mobile device or other non-mobile computing device. The user may be a person who uses the user input system 140 to execute resource transfers using one or more applications stored thereon. The one or more applications may be configured to communicate with the system 130, execute a transaction, input information onto a user interface presented on the user input system 140, or the like. The applications stored on the user input system 140 and the system 130 may incorporate one or more parts of any process flow described herein.

As shown in FIG. 1, the system 130, and the user input system 140 are each operatively and selectively connected to the network 110, which may include one or more separate networks. In addition, the network 110 may include a telecommunication network, local area network (LAN), a wide area network (WAN), and/or a global area network (GAN), such as the Internet. It will also be understood that the network 110 may be secure and/or unsecure and may also include wireless and/or wired and/or optical interconnection technology.

In some embodiments, the system 130 and the user input system 140 may be used to implement the processes described herein, including the mobile-side and server-side processes for installing a computer program from a mobile device to a computer, in accordance with an embodiment of the present invention. The system 130 is intended to represent various forms of digital computers, such as laptops, desktops, workstations, personal digital assistants, servers, blade servers, mainframes, and other appropriate computers. The user input system 140 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

In some embodiments, the system 130 may be configured to access, via the 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, it appears as though the memory is being allocated from a central pool of memory, even though the space is distributed throughout the system. This method of dynamically allocating memory provides increased flexibility when the data size changes during the lifetime of an application, and allows memory reuse for better utilization of the memory resources when the data sizes are large.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 140 may be made up of multiple computing devices communicating with each other.

FIG. 1 also illustrates a user input system 140, in accordance with an embodiment of the invention. The user input system 140 includes a processor 152, memory 154, an input/output device such as a display 156, a communication interface 158, and a transceiver 160, among other components. The user input system 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input system 140, including instructions stored in the memory 154. The processor may be implemented as a chipset of chips that include separate and multiple analog and digital processors. The processor may be configured to provide, for example, for coordination of the other components of the user input system 140, such as control of user interfaces, applications run by user input system 140, and wireless communication by user input system 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input system 140 with other devices. External interface 168 may provide, for example, for wired communication in some implementations, or for wireless communication in other implementations, and multiple interfaces may also be used.

The memory 154 stores information within the user input system 140. The memory 154 can be implemented as one or more of a computer-readable medium or media, a volatile memory unit or units, or a non-volatile memory unit or units. Expansion memory may also be provided and connected to user input system 140 through an expansion interface (not shown), which may include, for example, a SIMM (Single In Line Memory Module) card interface. Such expansion memory may provide extra storage space for user input system 140, or may also store applications or other information therein. In some embodiments, expansion memory may include instructions to carry out or supplement the processes described above, and may include secure information also. For example, expansion memory may be provided as a security module for user input system 140, and may be programmed with instructions that permit secure use of user input system 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein. It will be understood that the one or more applications stored in the system 130 and/or the user computing system 140 may interact with one another and may be configured to implement any one or more portions of the various user interfaces and/or process flow described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the user input system 140 to transmit and/or receive information or commands to and from the system 130. In this regard, the system 130 may be configured to establish a communication link with the user input system 140, whereby the communication link establishes a data channel (wired or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, or the like.

The user input system 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation—and location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker, e.g., in a handset of user input system 140. Such sound may include sound from voice telephone calls, may include recorded sound (e.g., voice messages, music files, etc.) and may also include sound generated by one or more applications operating on the user input system 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It will be understood that the embodiment of the system environment illustrated in FIG. 1 is exemplary and that other embodiments may vary. As another example, in some embodiments, the system 130 includes more, less, or different components. As another example, in some embodiments, some or all of the portions of the system environment 100 may be combined into a single portion. Likewise, in some embodiments, some or all of the portions of the system 130 may be separated into two or more distinct portions.

Data analytics is the science of analyzing raw data to make conclusions about the information. Data analytics techniques can reveal trends and metrics that would otherwise be lost in the mass of information. This information can then be used to optimize processes to increase the overall efficiency of a business or system. Data analytics typically involves cleaning, transformation, exploration, and modelling of data for decision making and supporting conclusions. While data analysis is used to provide a probability that the hypotheses occurs, machine learning is the practice of using algorithms to extract data, learn from it, and then forecast future trends for that topic. Traditional machine learning software is comprised of statistical analysis and predictive analysis that is used to spot patterns and catch hidden insights based on perceived data. Common use cases for machine learning include image recognition and classification, and speech recognition and language translation.

Mainframe environments include computing systems are capable of handling and processing very large amounts of data very quickly. Most entities still use mainframe computers to process large amount of data efficiently. But analyzing this data by directly querying the mainframe computing system can be complex and resource heavy, with transactions being executed based on MIPS (millions of instructions per second). To meet evolving business needs, entities need to integrate mainframe data into big data analytics platforms. The present invention provides the functional benefit of integrating data analytics resources into mainframe computing systems.

FIG. 2 illustrates a process flow for implementing data analytics in a mainframe environment 200, in accordance with an embodiment of the invention. As shown in block 202, the process flow includes determining one or more data analytics resources. In some embodiments, the one or more data analytics resources may be associated with natural language processing algorithms. In some embodiments, the one or more data analytics resources may include at least a vectorization engine, a normalization engine, a contextual and temporal information capture engine, and an optimization engine. As described herein, each of these data analytics resources may be configured to process one or more documents retrieved from a document repository.

Next, as shown in block 204, the process flow includes initiating one or more compiler protocols on the one or more data analytics resources to build one or more executable code for the one or more data analytics resources capable of being executed on a mainframe environment. In some embodiments, a mainframe environment may include one or more mainframe computing systems known for their large size, amount of storage, processing power and high level of reliability.

Next, as shown in block 206, the process flow includes establishing a communication link with a job control language (JCL) subsystem associated with the mainframe environment. In some embodiments, JCL subsystem identifies the executable code to be executed, the inputs that are required, and the location of the input/output, and informs the operating system of the mainframe computing systems within the mainframe environment.

Next, as shown in block 208, the process flow incudes transmitting the one or more executable code for the one or more data analytics resources to the JCL subsystem. In some embodiments, JCL is used in a mainframe environment to act as a communication between the one or more data analytics resources and a mainframe operating system. In a mainframe environment, programs can be executed in batch and online mode. Example of a batch system can be processing the financial institution transactions through a VSAM (Virtual Storage Access Method) file and applying it to the corresponding accounts. In batch mode, programs are submitted to the operating system as a job through a JCL.

Next, as shown in block 210, the process flow includes generating, using the JCL subsystem, one or more job control statements based on at least the one or more executable code for the one or more data analytics resources. In some embodiments, a job may be specified using the JCL subsystem as a number of steps defined as a series of job control statements.

Next, as shown in block 212, the process flow includes generating a log of the one or more job control statements. In some embodiments, the generating the job log may include storing the one or more job control statements in a queue. In one aspect, the one or more job control statements stored in the queue may be assigned a priority.

Next, as shown in block 214, the process flow includes initiating an execution of the one or more job control statements on the mainframe environment based on at least the generated log. In embodiments where the job control statements are assigned a priority, the job control statement is taken up for execution from the job queue when the job control statement reaches its highest priority.

FIG. 3 illustrates a flowchart for implementing data analytics in a mainframe environment 300, in accordance with an embodiment of the invention. As shown in step 302, the flow chart includes a document repository. The document repository may include one or more documents. In one aspect, the one or more documents may include information that is represented in a string of text. In some embodiments, the one or more documents may be associated with one or more document types, which are then used to define class labels for the documents. To retrieve the documents from the document repository, the system may be configured to establish a communication link with the document repository. In response, the system may be configured to electronically receive, via the established communication link, the one or more documents from the document repository.

Next, as shown in step 304, the documents retrieved from the document repository are pre-processed to transform the raw data in a useful and efficient format. In some embodiments, the data pre-processing step may include data wrangling and the generation of a database schema. In one aspect, data wrangling may include the process of transforming and mapping data from one format to another with the intent of making it more appropriate and valuable for a variety of downstream purposes such as data analytics. In one aspect, generating the database schema may include describing the structure of the database in which the pre-processed data are going to be stored in using a formal language supported by the database management system. In other words, database schema may refer to a visual representation of a database, a set of rules that govern a database, or to the entire set of objects belonging to a particular user. It can exist both as a visual representation and as a set of formulas known as integrity constraints that govern a database. These formulas are expressed in a data definition language, such as SQL. As part of a data dictionary, a database schema indicates how the entities that make up the database relate to one another, including tables, views, stored procedures, and more.

Next, at step 306, the pre-processed data is then subject to data analytics. As shown in FIG. 3, the subjecting the pre-processed data may include implementing one or more data analytics layers. In one aspect, the data analytics layers may include a resource implementation layer, a build layer, and a compilation layer. In some embodiments, the resource implementation layer may include the one or more data analytics resources described herein.

In some embodiments, the system may be configured to initiate the contextual and temporal information capture engine on the one or more documents. Contextual and temporal information capture engine operates based on the theory that each observation (variable) may or may not depend on its context (conditional variables). For example, in natural language processing, each word may be dependent on one or more other words that immediately follow the word or precede the word. Accordingly, extracting contextual and temporal information may involve breaking down the string of texts to determine a particular setting or situation in which the texts in the string of texts occur. In some embodiments, specific portions of the documents may be context-free. To this extent, the system may be may configured to decompose the string of texts into two parts: context-sensitive and context-free.

In some embodiments, the system may be configured to initiate the vectorization engine on the one or more documents and the retrieved contextual and temporal data. Representing documents numerically facilitates meaningful analytics to be performed and also creates the instances on which machine learning algorithms operate. In text analysis, instances are entire documents or utterances, which can vary in length. Each property of the vector representation is a feature. For text, features represent attributes and properties of documents—including its content as well as meta attributes, such as document length, author, source, and publication date. When considered together, the features of a document describe a multidimensional feature space on which machine learning methods can be applied. By initiating the vectorization engine, the system may be configured to map the information represented in a string of text into a vector of real numbers. In one aspect, vectorizing the contextual and temporal data further includes decomposing the context-free and context-sensitive groupings into a weighted sum of vectors. In one aspect, in addition to vectorizing the documents, the system may be configured to map the one or more class labels associated with the one or more documents into a vector of real numbers to generate one or more vectorized class labels. In some embodiments, the system may be configured to initiate the normalization engine on the vector of real numbers. In one aspect, initiating the normalization engine on the vector of real numbers, the system may be configured to determine a direction of the vector of real numbers.

In some embodiments, the system may be configured to initiate the optimization engine on the normalized vector of real numbers and the one or more vectorized class labels. In one aspect, by initiating the optimization engine, the system may be configured to generate an optimized training model using the normalized vector of real numbers and the one or more vectorized class labels. In this regard, the system may be configured to implement one or more machine learning algorithms on the normalized vector of real numbers and the one or more vectorized class labels. In some embodiments, the system may be configured to implement any of the following applicable machine learning algorithms either singly or in combination: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) can be used in generating data relevant to the system 130.

By implementing the one or more machine learning algorithms, the system may be configured to generate a first set of parameters configured to predict at least one of the one or more vectorized class labels to be associated with one or more unseen documents. Typically, the training process is iterative, meaning that it progresses step by step with small updates to the set of parameters in each iteration and, in turn, a change in the performance of the training model each iteration. In some embodiments, the first set of parameters may be generated by solving the optimization problem that finds for parameters that result in minimum error or loss.

In some embodiments, the data analytics layer is implemented in a high-level language. To execute the data analytics resources on a mainframe environment, the high-level code must be translated into low level language (object/target/machine language). In this regard, the system may be configured to implement the build layer and compilation layer. Accordingly, the high-level language in which the data analytics layer is implemented is compiled into a set of executable binaries, that in turn get packaged into a software build capable of being executed on the mainframe environment. To this extent, the system may be configured to compile the data analytics resources into compiled files in compressed formats, produce installers, and create or update database schema or data. In doing so, the system may be configured to translate the high-level language into executable code on the mainframe environment.

At step 308, once the executable code is generated, the system may be configured to transmit the executable code to a mainframe environment for execution. As described herein, the executable code is converted into a series of job control statements and logged for execution on the mainframe environment. In some embodiments, these job control statements may be accessed by a user via a computing device. In this regard, the system may be configured to establish a communication link with a computing device associated with a user. In response, the system may be configured to electronically receive, from the computing device of the user, an indication to access the mainframe environment and generate a report of the job control statements. In some embodiments, the mainframe environment may include a security governance protocol. In one aspect, the security governance protocol may be configured to implement an authentication requirement for any external computing devices requesting access to the job control statements to validate an identity and authorization level of the user. Accordingly, the system may be configured to initiate, via the security governance protocol, an authentication request to the user in response to receiving the indication to access the mainframe environment. In response, the system may be configured to electronically receive, from the computing device of the user, one or more authentication credentials associated with the user. In response to receiving the authentication credentials, the system may be configured to validate the one or more authentication credentials to verify the identity of the user and determine whether the authorization level of the user meets an authentication requirement associated with the mainframe environment to authorize access. In response, the system may be configured to authorize the user to access the mainframe environment using the computing device of the user.

In some embodiments, to enable the computing device of the user to access the mainframe environment, at step 310, the system may be configured to implement an integration layer. In some embodiments, the system may be configured to retrieve information associated with one or more application programming interfaces (APIs) associated with the computing device of the user. In response, the system may be configured to initiate, via the integration layer, one or more data interchange format engines configured as a middle layer between the mainframe environment and the one or more APIs. In some embodiments, the integration layer may include Java Connector Architecture (JCA) component, an Interaction Service Productivity Facility (ISPF) component, and Restructured Extended Executor (REXX) component as part of the integration solution between the mainframe environment and the one or more APIs. In one aspect, the JCA provides a distributed feed to the one or more APIs from the mainframe environment to view the logs, generate reports, and monitor the optimization training and prediction parameters. In one aspect, the ISPF component may be used to generate the user interface connecting the mainframe environment to the one or more APIs. In one aspect, the REXX component may be configured to handle the reactivity in the panels and invoking the system capabilities. In one aspect, the system may be configured to electronically receive, via the one or more data interchange format engines, information associated with the one or more job control statements. In response, the system may be configured to convert the information associated with the one or more job control statements from a first format to a second format. Here, the first format is associated with the mainframe environment and the second format is associated with the one or more APIs associated with the computing device of the user. In one aspect, the first format is incompatible with the one or more APIs and the second format is incompatible with the mainframe environment. In response to converting the format, the system may be configured to transmit control signals configured to cause the computing device of the user to display, via the one or more APIs, the information associated with the one or more job control statements in the second format.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for implementing data analytics in a mainframe environment, the system comprising:
   at least one non-transitory storage device; and
   at least one processing device coupled to the at least one non-transitory storage device, wherein the at least one processing device is configured to:
   determine one or more data analytics resources associated with natural language processing algorithms;
   initiate one or more compiler protocols on the one or more data analytics resources to build one or more executable code for the one or more data analytics resources capable of being executed on a mainframe environment;
   establish a communication link with a job control language (JCL) subsystem associated with the mainframe environment;
   transmit the one or more executable code for the one or more data analytics resources to the JCL subsystem;
   generate, using the JCL subsystem, one or more job control statements based on at least the one or more executable code for the one or more data analytics resources, wherein the one or more job control statements are configured to be executable on the mainframe environment;
   receive, from a computing device of a user, an indication to access the mainframe environment;
   initiate one or more data interchange format engines configured as a middle layer between the mainframe environment and the one or more Application Programming Interfaces (APIs);
   receive, from the computing device of the user, a request to generate a log of the one or more job control statements;
   in response to the request, generate a log of the one or more job control statements, wherein generating the log further comprises placing the one or more job control statements in a queue; and
   initiate an execution of the one or more job control statements on the mainframe environment based on at least the generated log.

2. The system of claim 1, wherein the at least one processing device is further configured to:
  determine the one or more data analytics resources, wherein the one or more data analytics resources comprises at least a vectorization engine, a normalization engine, a contextual and temporal information capture engine, and an optimization engine.

3. The system of claim 2, wherein the at least one processing device is further configured to:
  establish a communication link with a document repository; and
  electronically retrieve, via the established communication link, one or more documents from the document repository, wherein the one or more documents comprises information represented in a string of text, wherein the one or more documents are associated with one or more class labels.

4. The system of claim 3, wherein the at least one processing device is further configured to:
  initiate the contextual and temporal information capture engine on the one or more documents, wherein initiating further comprises retrieving contextual and temporal data associated with the information represented in a string of text.

5. The system of claim 4, wherein the at least one processing device is further configured to:
  initiate the vectorization engine on the one or more documents and the retrieved contextual and temporal data, wherein initiating further comprises mapping the information represented in a string of text into a vector of real numbers.

6. The system of claim 5, wherein initiating the vectorization engine on the one or more documents further comprises mapping the one or more class labels into a vector of real numbers to generate one or more vectorized class labels.

7. The system of claim 6, wherein the at least one processing device is further configured to:
  initiate the normalization engine on the vector of real numbers, wherein initiating further comprises normalizing the vector of real numbers to determine a direction of the vector of real numbers.

8. The system of claim 7, wherein the at least one processing device is further configured to:
  initiate the optimization engine on the normalized vector of real numbers and the one or more vectorized class labels, wherein initiating further comprises generating an optimized training model using the normalized vector of real numbers and the one or more vectorized class labels, wherein the optimized training model comprises a first set of parameters configured to predict at least one of the one or more vectorized class labels to be associated with one or more unseen documents.

9. The system of claim 1, wherein the at least one processing device is further configured to:
  establish a communication link with the computing device associated with the user;
  retrieve information associated with one or more APIs associated with the computing device of the user; and
  initiate the one or more data interchange format engines configured as the middle layer between the mainframe environment and the one or more APIs.

10. The system of claim 9, wherein the at least one processing device is further configured to:
  electronically receive, via the one or more data interchange format engines, information associated with the one or more job control statements;
  convert the information associated with the one or more job control statements from a first format to a second format, wherein the first format is associated with the mainframe environment, wherein the second format is associated with the one or more APIs associated with the computing device of the user; and
  transmit control signals configured to cause the computing device of the user to display, via the one or more APIs, the information associated with the one or more job control statements in the second format,
  wherein the first format is incompatible with the one or more APIs and the second format is incompatible with the mainframe environment.

11. The system of claim 9, wherein the at least one processing device is further configured to:
  initiate a security governance engine in response to receiving the indication from the computing device of the user to access the mainframe environment to validate an identity and authorization level of the user.

12. The system of claim 11, wherein the at least one processing device is further configured to:
  initiate, via the security governance engine, an authentication request to the user in response to receiving the indication to access the mainframe environment;
  electronically receive, from the computing device of the user, one or more authentication credentials associated with the user;
  validate the one or more authentication credentials, wherein validating further comprises verifying the identity of the user and determining whether the authorization level of the user meets an authentication requirement associated with the mainframe environment to authorize access; and
  authorize the user to access the mainframe environment using the computing device of the user.

13. A computer program product for implementing data analytics in a mainframe environment, the computer program product comprising a non-transitory computer-readable medium comprising code causing a first apparatus to:
  determine one or more data analytics resources associated with natural language processing algorithms;
  initiate one or more compiler protocols on the one or more data analytics resources to build one or more executable code for the one or more data analytics resources capable of being executed on a mainframe environment;
  establish a communication link with a job control language (JCL) subsystem associated with the mainframe environment;
  transmit the one or more executable code for the one or more data analytics resources to the JCL subsystem;
  generate, using the JCL subsystem, one or more job control statements based on at least the one or more executable code for the one or more data analytics resources, wherein the one or more job control statements are configured to be executable on the mainframe environment;
  receive, from a computing device of a user, an indication to access the mainframe environment;
  initiate one or more data interchange format engines configured as a middle layer between the mainframe environment and the one or more Application Programming Interfaces (APIs);
  receive, from the computing device of the user, a request to generate a log of the one or more job control statements;

in response to the request, generate a log of the one or more job control statements, wherein generating the log further comprises placing the one or more job control statements in a queue; and initiate an execution of the one or more job control statements on the mainframe environment based on at least the generated log.

14. The computer program product of claim 13, wherein the first apparatus is further configured to:

determine the one or more data analytics resources, wherein the one or more data analytics resources comprises at least a vectorization engine, a normalization engine, a contextual and temporal information capture engine, and an optimization engine.

15. The computer program product of claim 14, wherein the first apparatus is further configured to:

establish a communication link with a document repository; and electronically retrieve, via the established communication link, one or more documents from the document repository, wherein the one or more documents comprises information represented in a string of text, wherein the one or more documents are associated with one or more class labels.

16. The computer program product of claim 15, wherein the first apparatus is further configured to:

initiate the contextual and temporal information capture engine on the one or more documents, wherein initiating further comprises retrieving contextual and temporal data associated with the information represented in a string of text.

17. The computer program product of claim 16, wherein the first apparatus is further configured to:

initiate the vectorization engine on the one or more documents and the retrieved contextual and temporal data, wherein initiating further comprises mapping the information represented in a string of text into a vector of real numbers.

18. The computer program product of claim 17, wherein initiating the vectorization engine on the one or more documents further comprises mapping the one or more class labels into a vector of real numbers to generate one or more vectorized class labels.

19. The computer program product of claim 17, wherein the first apparatus is further configured to:

initiate the normalization engine on the vector of real numbers, wherein initiating further comprises normalizing the vector of real numbers to determine a direction of the vector of real numbers.

20. A method for implementing data analytics in a mainframe environment, the method comprising:

determining one or more data analytics resources associated with natural language processing algorithms;

initiating one or more compiler protocols on the one or more data analytics resources to build one or more executable code for the one or more data analytics resources capable of being executed on a mainframe environment;

establishing a communication link with a job control language (JCL) subsystem associated with the mainframe environment;

transmitting the one or more executable code for the one or more data analytics resources to the JCL subsystem;

generating, using the JCL subsystem, one or more job control statements based on at least the one or more executable code for the one or more data analytics resources, wherein the one or more job control statements are configured to be executable on the mainframe environment;

receiving, from a computing device of a user, an indication to access the mainframe environment;

initiating one or more data interchange format engines configured as a middle layer between the mainframe environment and the one or more Application Programming Interfaces (APIs);

receiving, from the computing device of the user, a request to generate a log of the one or more job control statements;

in response to the request, generating a log of the one or more job control statements, wherein generating the log further comprises placing the one or more job control statements in a queue; and initiating an execution of the one or more job control statements on the mainframe environment based on at least the generated log.

* * * * *